Figure 1:
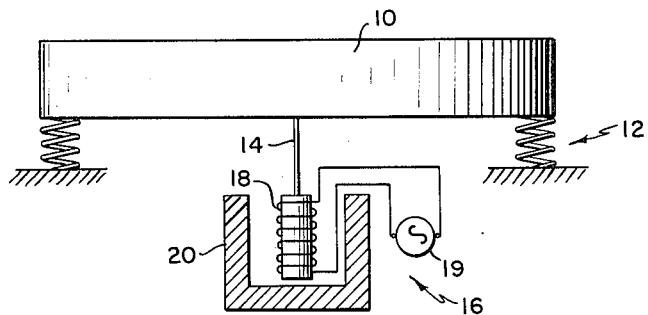

July 26, 1966            F. SCHLOSS            3,262,308

VIBRATING TABLE STRUCTURE

Filed Jan. 10, 1964

INVENTOR.
FRED SCHLOSS
BY O. E. Hodges
ATTY.

United States Patent Office 3,262,308
Patented July 26, 1966

3,262,308
VIBRATING TABLE STRUCTURE
Fred Schloss, Arlington, Va., assignor to the United States of America as represented by the Secretary of the Navy
Filed Jan. 10, 1964, Ser. No. 337,102
7 Claims. (Cl. 73—71.6)

The invention described herein may be manufactured and used by or for the Government of the United States of America for governmental purposes without the payment of any royalties thereon or therefor.

This invention relates to vibrating tables, and more specifically to a vibrating table which vibrates along a single axis only.

Usually it is desired that an acceleration, velocity, or displacement pick-up instrument be senstiive to and respond to motion along a single axis only. The "sensitive axis" of the instrument is often referred to as defining that line of motion to which the instrument is sensitive or responsive. Practically, however, the instrument will pick-up some transverse motion, and it is necessary in calibrating the instrument to determine its transverse sensitivity.

One method of determing the transverse sensitivity of an acceleration, velocity, or displacement pick-up instrument is to set the instrument on a vibrating table with the sensitive axis of the instrument disposed 90° to the line of axial vibrations of the table (vibrations along a line perpendicular to the table surface), and checking the motion picked up by the instrument. However, any transverse vibrations of the table will readily be picked up by the instrument and mixed with the axial vibrations of the table picked up by the instrument to give an erroneous indication of the instrument's transverse sensitivity. Therefore, it is desirable to use a table which produces only axial vibrations.

Several techniques have been employed in an effort to overcome the above-mentioned complication which accompanies the transverse vibrations of the testing table, but none of these techniques have proved entirely effective. One technique is to vibrate the table in a low frequency range where minimum transverse vibrations occur, but obviously this method may not be employed when the test is to be performed at high frequencies. Another technique is to operates the table at tuned frequencies only, but this method too restricts the frequency range which may be employed. A third technique is to optically check the transverse vibrations of the table, and adjust the instrument readings to compensate for this factor. This technique is inaccurate (especially at high frequencies), and requires the constant attention of the engineer or technician.

The present invention provides a table which vibrates substantially only axially (along a line perpendicular to the table surface). This is accomplished by suspending a vibration source, via a thin rod, from the table surface. The rod has a high axial stiffness, but low transverse and torsional stiffnesses so that it passes only negligible amounts of transverse or rotational movement from the vibration source to the table surface, but transmits substantially all of the axial movement.

Accordingly, it is an object of this invention to provide a table structure which vibrates only along an axis perpendicular to the table surface.

It is another object of this invention to provide a vibrating table having substantially no transverse or rotational movement.

It is still another object of this invention to provide a vibrating table which vibrates substantially along an axial line only, and which is simple and inexpensive to construct.

Figure 2:
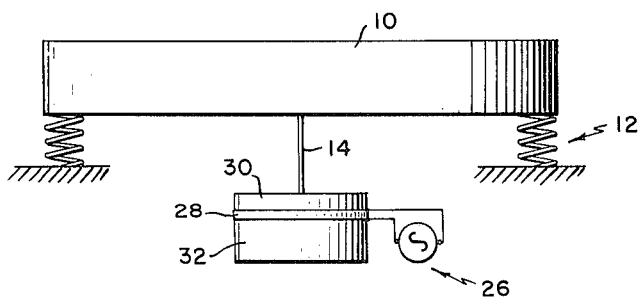

Other objects and many of the attendant advantages of this invention will be readily appreciated as the same becomes better understod by reference to the following detailed description when considered in connection with the accompanying drawings wherein:

FIG. 1 is an elevation view of a vibrating table constructed in accordance with this invention and utilizing an electromagnetic shaker as the vibration source; and FIG. 2 is an elevation view of a modified embodiment of the invention utilizing a piezoelectric shaker as the vibration source.

As can be seen in FIG. 1, a table surface member 10 is supported by resilient mounts 12. A shaker 16, acting as a vibration source, is suspended from table surface member 10 via a thin rod 14, with the gravitational center of the shaker being directly below the center of gravity of the table surface member with the line joining these two centers passing longitudinally through rod 14. Shaker 16 is electromagnetic having a stator member 20, an armature 18, and suitable means of electrical excitation 19. Rod 14 is connected at one end to armature 18, and at the other end to the table surface member, thereby placing the rod in tension between the table surface member and the suspended shaker.

The embodiment of FIG. 2 differs from that of FIG. 1 only by the type of shaker used. Shaker 26 includes a piezoelectric crystal wafer 28 secured between attachment or fixture 30 and inertial mass 32. The piezoelectric shaker was found to be most effective when frequencies greater than 1000 c.p.s. were to be used in the test, while the electromagnetic shaker was most effective in testing at frequencies less than 1000 c.p.s. While the resilient mounts 12 have been shown as a plurality of springs, it should be understood that a ring-shaped, air-filled rubber tube or any other suitable resilient members may be employed instead. The table surface member may be round, square, or any other suitable shape; and suspended shakers other than piezoelectric or electroelectric or electromagnetic types may be effectively employed in many applications of the invention.

The dimensions of the rod 14 will vary with the size and weight of the table surface member and the shaker employed, and with the operating frequencies of the testing table. The thinner the rod, the greater the length-to-diameter ratio, the greater the axial-to-transverse stiffness ratio, and the greater the axial-to-transverse force transmission ratio the more effective the rod in the vibrating table structure. Therefore, the rod should be as thin as possible, limited only by the fact that it must be thick enough to support the shaker member. For a given cross-sectional area of the rod, the resonant frequency of the rod will be proportional to its length. Therefore, the rod should be short enough for its first or lowest resonant frequency to be higher than or substantially equal to the highest frequency of vibration at which the testing table will be operated, so as to avoid standing waves and other adverse effects which would occur if the rod were caused to resonate. The rod may be made of any suitable rigid material. Steel, for example, has been found to be very effective.

In operation, when the shaker is caused to vibrate, substantially only axial vibrations (vibrations along a line perpendicular to the table surface) will be transmitted through the rod to the table surface member, the rod acting as a mechanical filter against all but axial vibrations.

*Example.*—In one test, a steel rod having a diameter of one-eighth inch and a length of two inches was used with an electromagnetic shaker and a round steel table surface member having a diameter of ten inches and a thickness of one and one-eighth inches. For equal transverse and axial force inputs at the shaker end of the rod, the transverse motion of the table was found to be $1/300$ of the axial motion at frequencies below the first resonant frequency of the rod (which was 2100 c.p.s. for this rod).

Obviously many modifications and variations of the present invention are possible in the light of the above teachings. It is therefore to be understood that within the scope of the appended claims the invention may be practiced otherwise than as specifically described.

What is claimed is:
1. A vibrating table structure including:
   a table surface member having a periphery;
   resilient mounting means directly supporting said table surface member on said periphery;
   a relatively thin rod being secured at its ends only and one end being secured to the table surface member and freely hanging downwardly therefrom;
   and a shaker attached to and suspended from the other end of said rod, thereby placing said rod in tension between said table surface member and said shaker; whereby, when said shaker is caused to vibrate, it will transmit axial vibrations, and substantially only axial vibrations through said rod to said table.
2. A vibrating table structure according to claim 1, wherein said rod is slightly thicker than is necessary to support said shaker, and is short enough that its lowest resonant frequency is greater than or substantially equal to the highest frequency of vibration at which the table surface member will be vibrated.
3. A vibrating table structure according to claim 2, wherein the rod is made of steel.
4. A vibrating table structure according to claim 1, wherein said rod has a high axial stiffness with respect to its transverse and torsional stiffnesses.
5. A vibrating table structure according to claim 1 wherein said shaker is electromagnetic.
6. A vibrating table structure according to claim 1, wherein said shaker is piezoelectric.
7. A vibrating table structure according to claim 1, wherein said table surface member is circular.

References Cited by the Examiner
FOREIGN PATENTS
669,462   12/1938   Germany.

OTHER REFERENCES
Honnell, P. M.: Geophysics volume 28, No. 1, pages 161–165, January 1953.
Kaufman, A. G.: Instruments and Control Systems, volume 33, page 241, February 1960.

RICHARD C. QUEISSER, *Primary Examiner.*
L. R. FRANKLIN, *Assistant Examiner.*